(12) United States Patent
Du et al.

(10) Patent No.: US 11,214,094 B1
(45) Date of Patent: *Jan. 4, 2022

(54) INNER-C-FORGING ASSEMBLY, FRONT AXLE ASSEMBLY AND MODIFICATION METHOD THEREOF

(71) Applicant: SHANGHAI YINSHUN TRADING CO., LTD., Shanghai (CN)

(72) Inventors: Dehui Du, Shanghai (CN); Jia Fu, Shanghai (CN)

(73) Assignee: SHANGHAI YINSHUN TRADING CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/459,929

(22) Filed: Aug. 27, 2021

(30) Foreign Application Priority Data

Jun. 18, 2021 (CN) .......................... 202110681408.X
Jun. 18, 2021 (CN) .......................... 202121371523.9

(51) Int. Cl.
*B60B 35/16* (2006.01)
*B60B 35/00* (2006.01)
*B60B 35/12* (2006.01)
*B62D 7/18* (2006.01)
*F16B 7/04* (2006.01)

(52) U.S. Cl.
CPC ............ *B60B 35/16* (2013.01); *B60B 35/003* (2013.01); *B60B 35/121* (2013.01); *B62D 7/18* (2013.01); *F16B 7/0406* (2013.01)

(58) Field of Classification Search
CPC ..... B60B 35/003; B60B 35/121; B60B 35/16; B60B 35/007; B60B 35/12; B60B 35/122; B62D 7/18; F16B 7/0406
See application file for complete search history.

(56) References Cited

U.S. PATENT DOCUMENTS

| | | | | |
|---|---|---|---|---|
| 2,512,881 | A * | 6/1950 | Smiley, Jr. ............... | B62D 7/18 384/396 |
| 3,549,166 | A * | 12/1970 | Moore .................... | B60G 7/005 280/93.512 |
| 7,377,598 | B2 * | 5/2008 | Doud ..................... | B60B 35/003 301/137 |
| 2011/0204589 | A1 * | 8/2011 | Reiter .................... | B60B 35/003 280/124.11 |
| 2018/0066720 | A1 * | 3/2018 | Dilworth ............. | F16D 65/0056 |

* cited by examiner

*Primary Examiner* — Jason R Bellinger
(74) *Attorney, Agent, or Firm* — Cheng-Ju Chiang (57) ABSTRACT

The present disclosure provides an inner-C-forging assembly, an integral front axle assembly, and modification method thereof. The inner-C-forging assembly includes an inner-C-forging and a connection structure. The inner-C-forging is configured for connecting with a kingpin knuckle. The connection structure is configured for connecting with an axle tube. The inner-C-forging is detachably fixed to the connection structure, and the inner-C-forging has different mounting states relative to the connection structure. At different mounting states, a kingpin installation portion of the inner-C-forging has different positions relative to the connection structure. In the present disclosure, vehicle's caster angles on both sides and the pinion to driveshaft angle can be conveniently and independently adjusted while ensuring the support strength.

20 Claims, 10 Drawing Sheets

INNER-C-FORGING ASSEMBLY, FRONT AXLE ASSEMBLY AND MODIFICATION METHOD THEREOF

CROSS REFERENCE TO RELATED APPLICATION

The patent application claims the priority of Chinese patent application number 202110681408.X, filed on Jun. 18, 2021, submitted by Shanghai Yinshun Trading Co., Ltd., and entitled "INNER-C-FORGING ASSEMBLY, INTEGRAL FRONT AXLE AND MODIFICATION METHOD THEREOF", and Chinese patent application number 202121371523.9, filed on Jun. 18, 2021, submitted by Shanghai Yinshun Trading Co., Ltd., and entitled "INNER-C-FORGING ASSEMBLY AND INTEGRAL FRONT AXLE WITH THE SAME". The entire disclosure of the above-identified application is incorporated herein by reference.

FIELD OF THE INVENTION

The present disclosure relates to automobile structures, and in particular to an inner-C-forging assembly, a front axle assembly and modification method thereof.

BACKGROUND OF THE INVENTION

Since the launch of the first off-road vehicle model, the appearance, interior trim, four-wheel drive technology, and power system of the off-road vehicle have made great progress, however, as the core of the chassis, the integral front axle assembly has not been substantially improved.

In the past 25 years, the global sales of off-road vehicles have exceeded 30 million, and consumers' demand for customization and modification of such models is also increasing day by day. For global automakers and modification shops, changing to the bigger tires, replacing or enhancing the suspension system to lift the vehicle chassis for more ground clearance, and making the overall appearance of the vehicle more attractive have become the most common ways of customization in the industry. However, the lift of the vehicle chassis also brings the following problems that obviously affect the vehicle handling experience, moreover, seriously threaten the safety of the people in the vehicle.

1. With the vehicle chassis lifted, the pinion to driveshaft angle has increased, causing the u-joint of the driveshaft to vibrate, thereby easily damaging the u-joints, seals, etc., and greatly increasing the probability of abnormal damage to the driveshaft and transfer case. At the same time, obvious chassis vibration is generated due to the distortion of these components during the running of the vehicle.

2. The lifted vehicle chassis also brings the drastic change in the installation position of the integral front axle assembly, which results in the caster angles on both sides of the front axle becoming smaller at the same time. Consequently, when the vehicle is driving in a straight line, the front wheels will vibrate, the steering wheel will swing indeterminately, and the steering will be touchy at high speed and wheel return-to-center will be diminished when coming out of a turn, which makes the driver lose the road feeling and have no confidence in the vehicle handling even when driving on conventional roads.

3. The increase in tire diameter, the wear of tires, the left-right imbalance of the suspension system, and the combination of other factors cause the vehicle fail to run straight and even sway to left and right. Although the problem of not being able to run straight can be fundamentally solved by independently and properly adjusting the caster angle on one side, however, both inner-C-forgings on all the current integral front axle assemblies have been welded to the axle tube as a factory setting, thus, the caster angle cannot be independently adjusted.

4. In order to alleviate the vehicle deviation symptoms, (simply put, not being able to run straight line,) technicians often tend to adjust the wheelbase on one side by changing the length of the chassis control arms. However, not only this approach cannot fundamentally solve the problem of not being able to run straight, but also can make the vehicle produce distortion feeling when turning because the wheelbases on both sides are different from each other and no longer form a regular rectangle as the vehicle leaves the factory. In the course of running, the tires on both sides will do serpentine motion because of the wheelbases inconsistency, as a result, the direct feeling of driver is that the chassis is loose and unstable.

The fundamental reason why the above problems can not be solved is because of the common structural design of all the integral front axle assemblies in the current market: the caster angles on both sides and the pinion to driveshaft angle can not be independently adjusted, thus, consumers can only bear various vehicle handling problems and major potential safety hazards caused by this design. What global automakers and modification shops can do is to spend a lot of labor and time to continuously fine-tune the vehicles with underwhelming result, which leads to low customer satisfaction.

SUMMARY OF THE INVENTION

In order to solve the above-mentioned problems simultaneously, the present disclosure provides an inner-C-forging assembly, a front axle assembly, and a method for modifying the front axle assembly, the inner-C-forging assembly makes it possible for vehicle's caster angles on both sides and the pinion to driveshaft angle be adjusted conveniently and independently while ensuring the support strength of the front axle assembly. Meanwhile, the original position and angle of the mounting points of all components on an axle tube of the front axle assembly is still intact, and variables that affect the chassis wheelbase, directional accuracy, and suspension height will not be introduced.

The present disclosure provides an inner-C-forging assembly including an inner-C-forging and a connection structure. The inner-C-forging is configured for connecting with a kingpin knuckle. The connection structure is configured for connecting with an axle tube. The inner-C-forging is detachably fixed to the connection structure, and the inner-C-forging has different mounting states relative to the connection structure. At different mounting states, a kingpin installation portion of the inner-C-forging has different positions relative to the connection structure.

Furthermore, the connection structure comprises a first flange, the first flange is configured for being fixed to an end of the axle tube, the first flange is provided with a first connection hole, the inner-C-forging is provided with a second connection hole, and a connector is capable of passing through the first connection hole and the second connection hole to fix the inner-C-forging on the connection structure.

Furthermore, the second connection hole is provided on the inner-C-forging at an end away from the first flange.

Furthermore, one of the first connection hole and the second connection hole comprises an oblong hole, an insert is provided in the oblong hole, and a third connection hole is defined in the insert, the insert has a plurality of different models, and an axis of the third connection hole has different positions on different models of inserts.

Furthermore, the axis of the third connection holes of different models of inserts are all set on a same circle centered on an axis of an axle shaft pass-through hole of the inner-C-forging.

Furthermore, a center angle formed by the axis of the third connection holes, the axis of the inner-C-forging and the center of different inserts is different.

Furthermore, an angle between an axis of the kingpin installation portion and an axis of a driveshaft installation portion is adjusted within a range from 60° to 85° by utilizing different models of the inserts.

Furthermore, each of the first connection holes or each of the second connection holes is composed of a plurality of through holes, and the connector passes through one of the through holes and into a corresponding first connection hole or a corresponding second connection hole.

Furthermore, at each of the first connection hole or the second connection hole, the axis of the through holes are all set on a same circle centered on an axis of an axle shaft pass-through hole of the inner-C-forging or an axis of the axle tube.

Furthermore, at each of the first connection hole or the second connection hole, the plurality of the through holes form in two rows, on each row, the axis of the through holes are arranged on the same circle centered on the axis of the axle shaft pass-through hole or the axis of the axle tube, the distances from the axis of the two rows of through holes to the axis of the axle shaft pass-through hole or the axis of the axle tube are different.

Furthermore, the inner-C-forging is provided with a second flange at one side toward the first flange, and the second connection hole is formed in the second flange.

Furthermore, an accommodating cavity is formed in one of the first flange and the inner-C-forging, when the inner-C-forging is connected to the connection structure, the first flange or the inner-C-forging is received in the accommodation cavity.

Furthermore, a reinforcement shaft is provided on the inner-C-forging, when the inner-C-forging is fixed to the connection structure, the reinforcement shaft passes through the first flange.

The present disclosure further provides a front axle assembly including the inner-C-forging assembly.

The present disclosure further provides a method for modifying a front axle assembly, which includes the following steps: providing an integral front axle assembly with an inner-C-forging integrally fixed to an axle tube into a single piece; cutting off the inner-C-forging from the axle tube of the integral front axle assembly; providing the forgoing inner-C-forging assembly, and fixing the connection structure of the inner-C-forging assembly on an end surface of the axle tube; fixing the inner-C-forging of the inner-C-forging assembly to the connection structure.

According to the forgoing descriptions, in the present disclosure, the connection structure can be fixed to an end of the axle tube. Due to the inner-C-forging and the connection structure are separately arranged, when the inner-C-forging is fixed to the connection structure, the inner-C-forging has multiple mounting states relative to the connection structure, and the kingpin installation portion on the inner-C-forging may have different relative positions and angles relative to the connection structure. When the caster angle needs to be adjusted, the connection between the corresponding inner-C-forging and the connection structure can be loosened, the inner-C-forging can be rotated around the axis of the axle shaft pass-through hole or the axis of the axle tube to an appropriate angle, which accordingly changes the installation angle of the inner-C-forging relative to the axle tube, and changes the caster angle as well. Because the inner-C-forging can be rotated about the axis of the axle shaft pass-through hole or the axis of the axle tube toward the front and the rear directions of the vehicle, no matter the caster angle at which side of the vehicle needs to be adjusted, it can be adjusted by adjusting the installation angle of the corresponding inner-C-forging. Furthermore, since the inner-C-forging assembly is separated from the axle tube, and the integrity of the axle tube is ensured, so that the mounting points of the components on the axle tube, such as the support point of the shock absorber and the connection point of various pull rods, can be arranged on a complete axle tube, and the support strength of the front axle assembly can be ensured. Therefore, on the premise of ensuring the support strength of the front axle assembly, vehicle's caster angles on both sides and the pinion to driveshaft angle simultaneously can be adjusted conveniently and independently. The original position and angle of the mounting points of all components on the axle tube is still intact, and variables affecting the chassis wheelbase, directional accuracy and suspension height cannot be introduced.

In order to make the above mentioned purposes, characteristics and advantages be more apparent and understandable, detailed descriptions accompanying preferred embodiments are given below.

DETAILED DESCRIPTION OF PREFERRED EMBODIMENTS

Embodiments of the present disclosure will now be described more apparently and completely with reference to the embodiments. Obviously, the illustrated embodiments are only a part but not all of the embodiments of the present disclosure. All the other embodiments which could be obtained without creativity by one of ordinary skill in the art according to the illustrated embodiments would be claimed within the scope of the present disclosure.

The present disclosure provides an inner-C-forging assembly, a front axle assembly and modification method thereof. The inner-C-forging assembly makes it possible for vehicle's caster angles on both sides and the pinion to driveshaft angle be adjusted conveniently and independently while ensuring the support strength of the front axle assembly. Meanwhile, during adjustment, the original position and angle of mounting points of all components on an axle tube of the front axle assembly is still intact, and variables that affect chassis wheelbase, directional accuracy, and suspension height will not be introduced.

Figure 1:
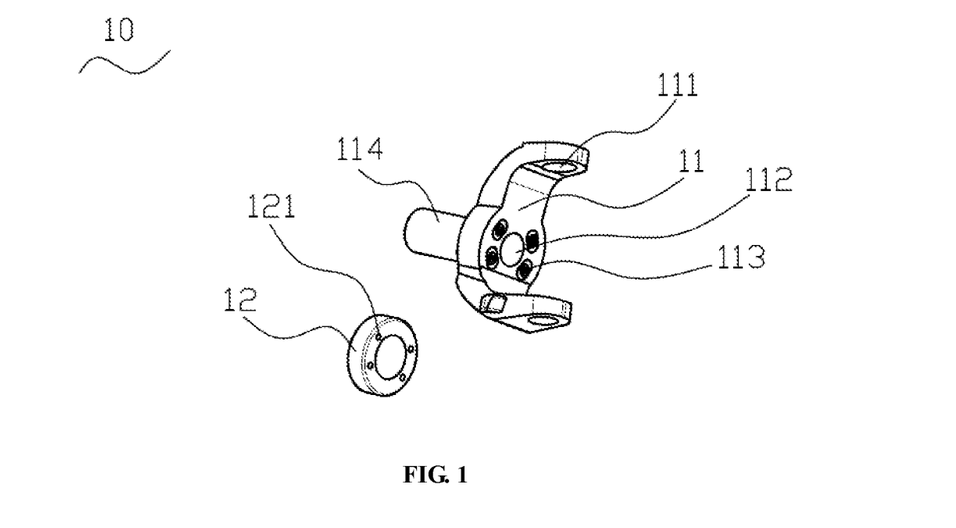
FIG. 1 is a schematic, isometric view of an inner-C-forging assembly according to a first embodiment of the present disclosure.
Figure 2:
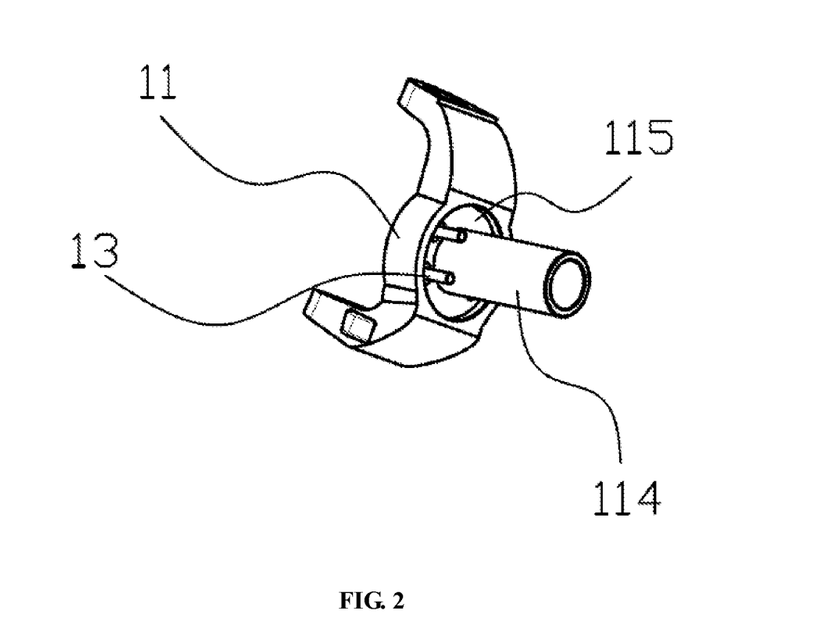
FIG. 2 is a schematic, isometric view of the inner-C-forging of FIG. 1 when viewed from another direction.
Figure 3:
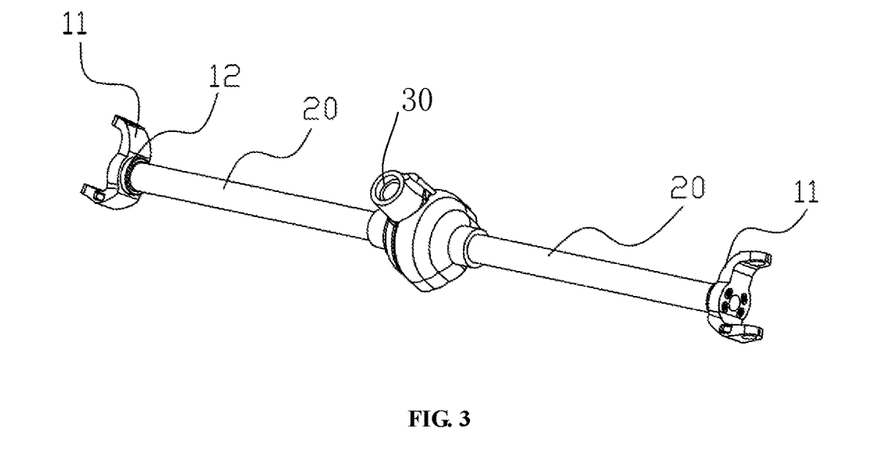
FIG. 3 is a schematic, isometric view of a front axle assembly with the inner-C-forging assembly of FIG. 1.
Figure 4:
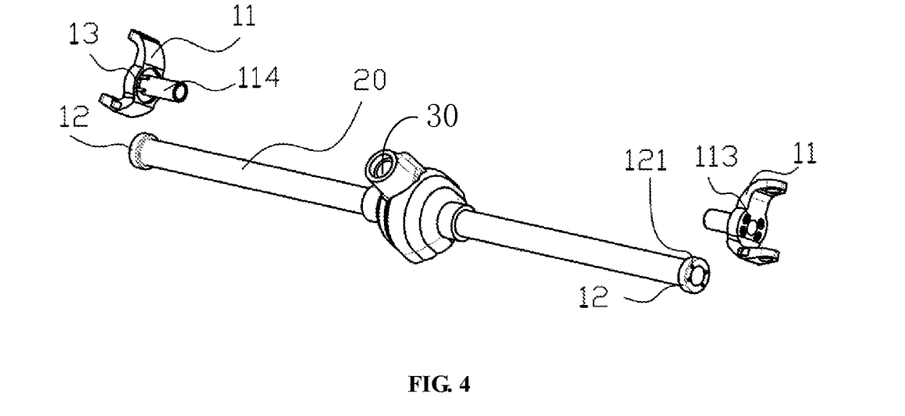
FIG. 4 is a schematic, exploded view of the front axle assembly of FIG. 3.
Figure 5:
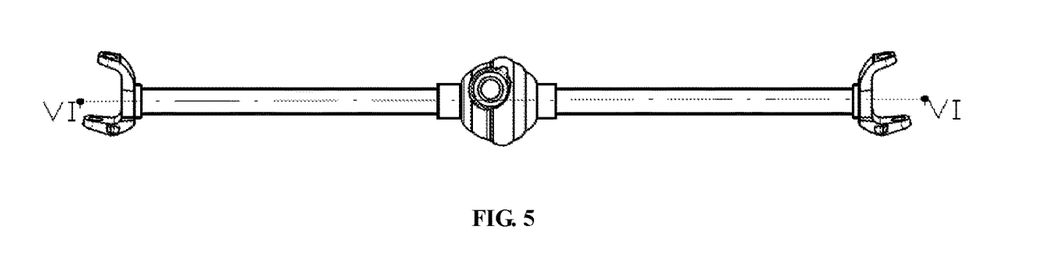
FIG. 5 is a schematic, front view of the front axle assembly of FIG. 3.
Figure 6:
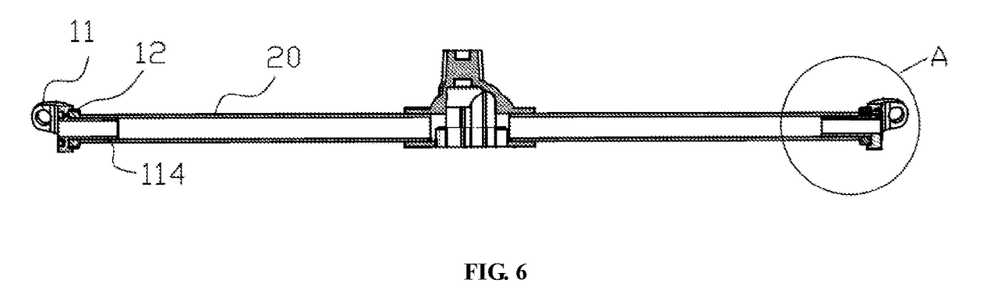
FIG. 6 is a schematic, cross-sectional view taken along line VI-VI of FIG. 5.
Figure 7:
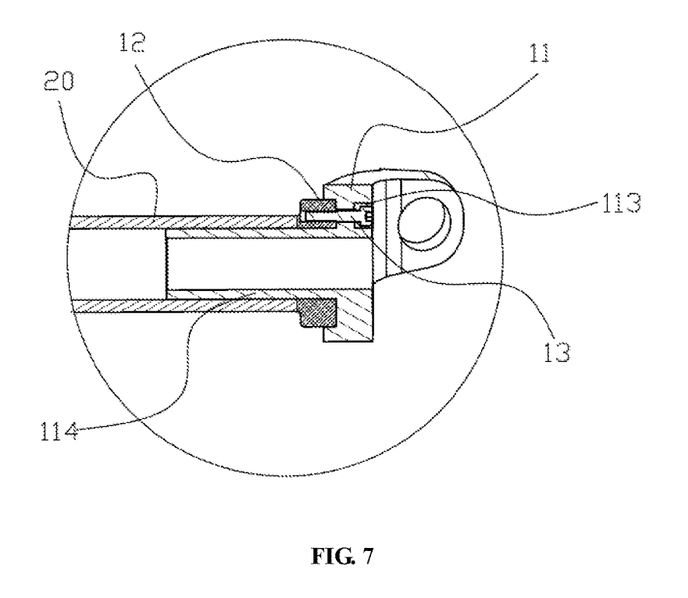
FIG. 7 is a schematic, enlarged view of the structure in circle A of FIG. 6.
Figure 8:
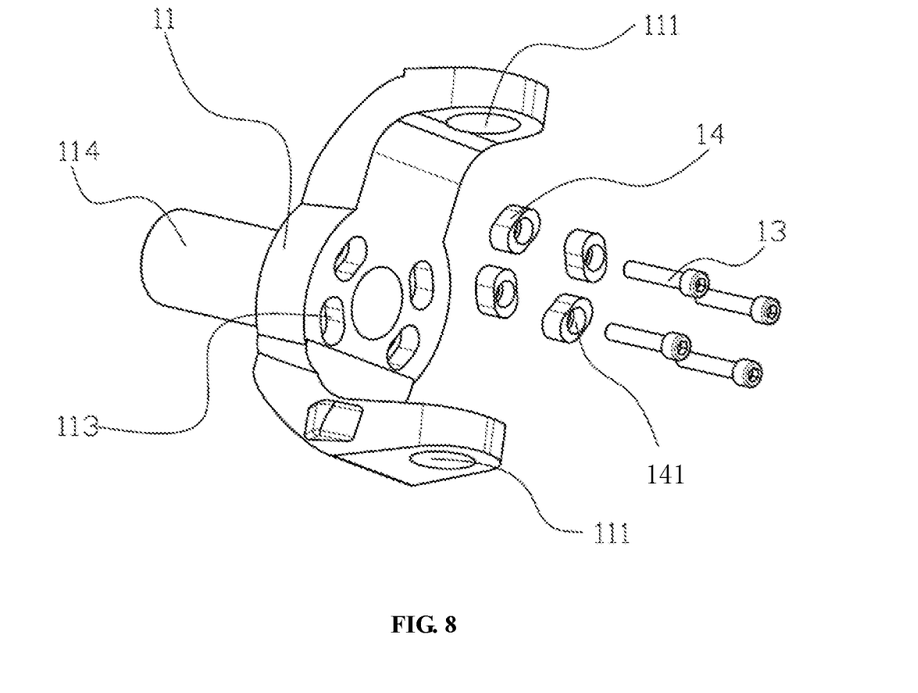
FIG. 8 is a schematic, exploded view of the inner-C-forging.
Figure 9:
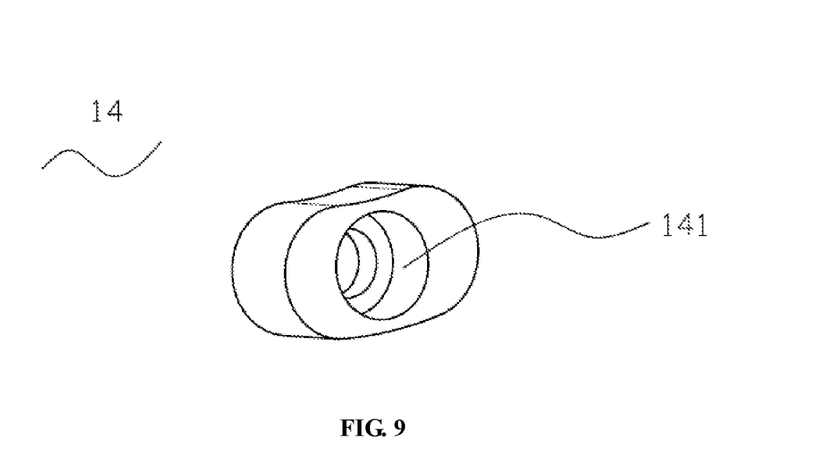
FIG. 9 is a schematic, isometric view of the insert of FIG. 8.

FIG. 1 is a schematic, isometric view of an inner-C-forging assembly according to a first embodiment of the present disclosure. FIG. 2 is a schematic, isometric view of the inner-C-forging of FIG. 1 when viewed from another direction. FIG. 3 is a schematic, isometric view of a front axle assembly with the inner-C-forging assembly of FIG. 1. FIG. 4 is a schematic, exploded view of the front axle assembly of FIG. 3. FIG. 5 is a schematic, front view of the front axle assembly of FIG. 3. FIG. 6 is a schematic, cross-sectional view taken along line VI-VI of FIG. 5. FIG. 7 is a schematic, enlarged view of the structure in circle A of FIG. 6. Referring to FIGS. 1-7, the inner-C-forging assembly 10 of the present disclosure includes an inner-C-forging 11 for connecting a kingpin knuckle, a connection structure 12 for connecting with a corresponding end of an axle tube 20. The axle tube 20 is fixed to an axle housing which has a driveshaft installation portion 30 for insertion of a driveshaft. The inner-C-forging 11 has different mounting states relative to the connection structure 12. At different mounting states, a kingpin installation portion 111 of the inner-C-forging 11 has different positions and angles relative to the connection structure 12.

In this embodiment, the connection structure 12 can be fixed to the corresponding end of the axle tube 20, and the inner-C-forging 11 can be fixed to the connection structure 12. Due to the inner-C-forging 11 and the connection structure 12 are separately arranged, when the inner-C-forging 11 is fixed to the connection structure 12, the inner-C-forging 11 has different mounting states relative to the connection structure 12, so that the kingpin installation portion 111 of the inner-C-forging 11 has different positions and angles relative to the connection structure 12. When the caster angle needs to be adjusted, the connection between the inner-C-forging 11 and the connection structure 12 at one side of the vehicle can be loosened, and the inner-C-forging 11 can be rotated around an axis of an axle shaft pass-through hole 112 of the inner-C-forging 11 to an appropriate angle, this changes the installation angle of the inner-C-forging 11 on the axle tube 20 so that the caster angle is accordingly changed. Since the inner-C-forging 11 can rotate about the axis of the axle shaft pass-through hole 112 toward both the front side and the rear side, no matter which side of the vehicle's caster angle needs to be adjusted, it can be adjusted by adjusting the installation angle of the corresponding inner-C-forging 11. Since the inner-C-forging 11 is separately arranged from the axle tube 20, the integrity of the axle tube 20 is ensured, so that the mounting points of the components on the axle tube 20, such as the support point of the shock absorber and the connection point of the pull rod, can be arranged on a complete axle tube, and the strength of the front axle assembly can be improved. Therefore, on the premise of ensuring the support strength of the front axle assembly, the vehicle's caster angles on both sides and the pinion to driveshaft angle simultaneously can be adjusted conveniently and independently. Meanwhile, the original mounting location and angle of all component mounting points on the axle tube 20 is still intact, and the variables affecting the chassis wheelbase, directional accuracy and suspension height cannot be introduced.

With continued reference to FIGS. 1-4, in this embodiment, the connection structure 12 may include a first flange. A plurality of first connection holes 121 are provided on the first flange, and a plurality of second connection hole 113 are provided on the inner-C-forging 11 at an end surface away from the first flange. The second connection holes 113 are disposed around the axle shaft pass-through hole 112. A connector 13, which may include a bolt and a nut, could pass through the second connection hole 113 and the first connection hole 121, to fix the inner-C-forging 11 onto the first flange. One of the first connection hole 121 and the second connection hole 113 includes an oblong hole, and the other one of the first connection hole 121 and the second connection hole 113 is a round hole. In this embodiment, the second connection hole 113 includes an oblong hole. The connector 13 sequentially passes through the inner-C-forging 11 and the first flange to fix the inner-C-forging 11 onto the axle tube 20, and the caster angle can be adjusted from an outer side of the vehicle body.

With reference to FIGS. 8-11, a plurality of oblong inserts 14 with its external contour adapted to the shape of the oblong hole are arranged in the oblong holes. A plurality of round third connection holes 141 are arranged on the inserts 14 respectively. The connector 13 could sequentially pass through the third connection hole 141, the second connection hole 113 and the first connection hole 121 to connect the inner-C-forging 11 onto the connection structure 12.

In the present embodiment, the oblong hole is a counterbore such that the bottom of the counterbore can support the insert 14, which prevents the insert 14 from coming off from the bottom side of the oblong hole.

The insert 14 has a plurality of different models. The axis of the third connection hole 141 has different positions on different models of inserts 14. Due to the position of the axis of the third connection hole 141 is different in different model of insert 14, when the inner-C-forging 11 is connected with the connection structure 12 through the inserts 14, the axis of the kingpin installation portion 111 of the inner-C-forging 11 forms a specific angle relative to the connection structure 12 and the axle tube 20. If the inner-C-forging 11 is fixed on the connection structure 12 by different models of inserts 14, the axis of the kingpin installation portion 111 will have different angles relative to the connection structure 12 and the axle tube 20.

Figure 10:
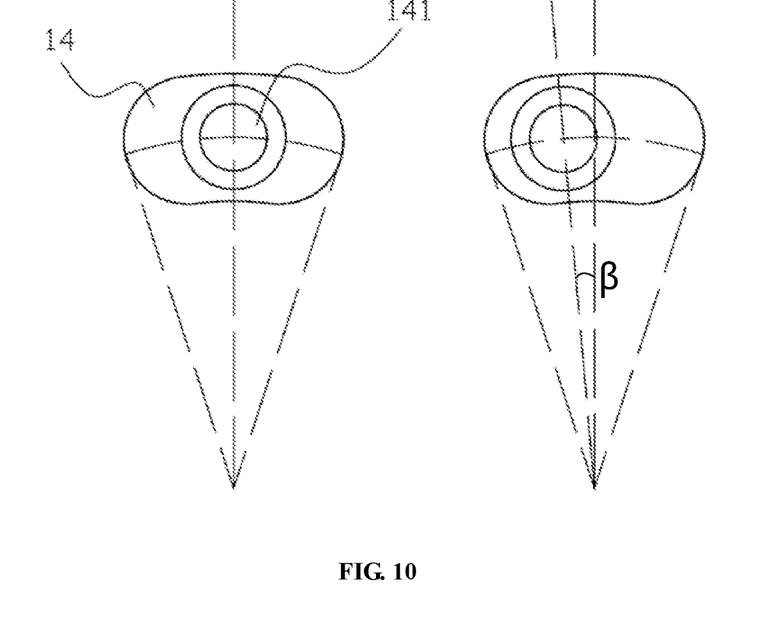
FIG. 10 is a schematic, front view of two different inserts.

Preferably, as shown in FIG. 10, when seen from the front side of the insert 14, on the same plane, the axis of the third connection holes 141 of different models of inserts 14 are all set on a same circle centered on the axis of the axle shaft pass-through hole 112, and longitudinal centerlines of the inserts 14 on the inner-C-forging 11 are set on the same circle as well. That is, on an orthographic projection surface of the inserts 14, a center angle β formed by the axis of the third connection holes 141, the axis of the axle shaft pass-through hole 112 and the center of different inserts 14 is different.

More particularly, the position of the third connection hole 141 is different in different models of insert 14 makes the caster angle α can be adjusted within a range from 60° to 85°, preferably, the caster angle α can be adjusted in a range from 67.2° to 82.2°. Therefore, a center angle of an arc connecting the center of the insert 14 with a center of an outermost third connection hole 141 is 7.5 degrees in left or right directions. That is, a center angle of an arc connecting a center of an outermost left third connection hole 141 and a center of an outermost right third connection hole 141 is 15°. During assembly, the rotation angle of the inner-C-forging 11 around the axis of the axle shaft pass-through hole 112 is 7.5 degrees toward the front or the back directions. By means of the forgoing arrangement, the requirement of various vehicles for adjusting the caster angle can be met.

Figure 11:
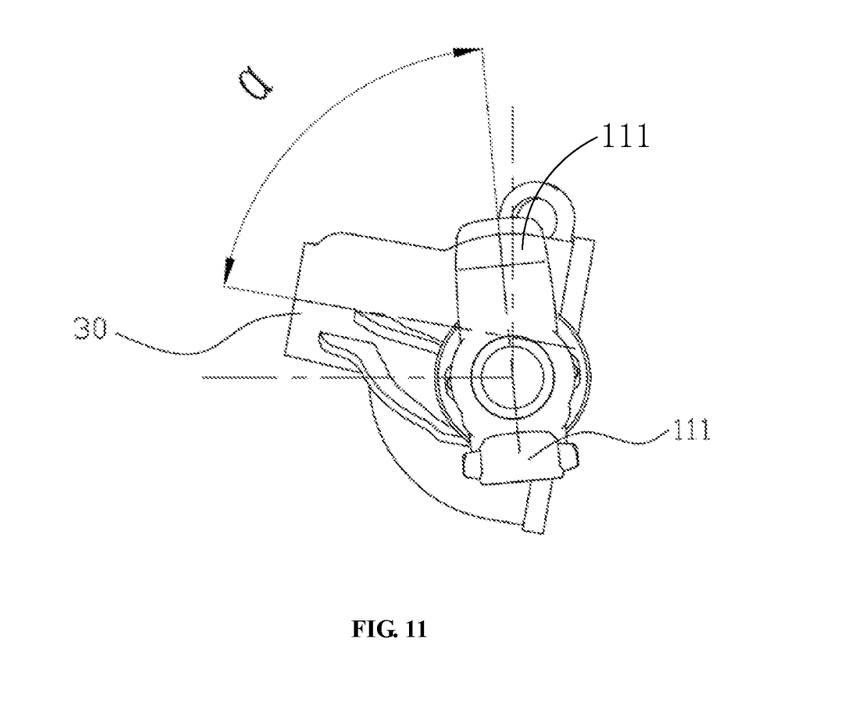
FIG. 11 is a schematic view of the caster to pinion angle.

FIG. 11 is a schematic view of the caster to pinion angle. As shown in FIG. 11, the caster to pinion angle α is shown. The caster to pinion angle α is formed between the axis of the kingpin installation portion 111 and the axis of the driveshaft installation portion 30, and the caster to pinion angle α equals to an angle between the inner-C-forging 11 and the driveshaft. By means of the forgoing arrangement, the caster to pinion angle α can be adjusted within a range from 60° to 85° without dissembling peripheral components. By means of the forgoing arrangement, the requirement of various vehicles for adjusting the caster angle can be met.

Furthermore, as shown in FIG. 1, a reinforcement shaft 114 is further arranged on the inner-C-forging 11 at one side facing the connection structure 12. When the inner-C-forging 11 is connected to the connection structure 12, the reinforcement shaft 114 extends through the connection structure 12 and into the axle tube 20. When the inner-C-forging 11 is connected to the connection structure 12, the axis of the axle shaft pass-through hole 112 coincides with the axis of the axle tube 20 and the axis of the front axle assembly.

Furthermore, referring to FIG. 2, an accommodating cavity 115 is formed in one of the first flange and the inner-C-forging 11, and the shape of the accommodating cavity 115 is adapted to the shape of the other one of the first flange and the inner-C-forging 11. In the embodiment, the accommodating cavity 115 is formed on the inner-C-forging 11. When the inner-C-forging 11 is connected to the connection structure 12, the first flange or the inner-C-forging 11 is received in the accommodating cavity 115. By means of the arrangement of the accommodating cavity 115, the inner sidewall of the accommodating cavity 115 can support the outer sidewall of the first flange or the inner-C-forging 11, so that the strength of the main axle is ensured after the inner-C-forging assembly 10 is fixed to the axle tube 20.

Figure 12:
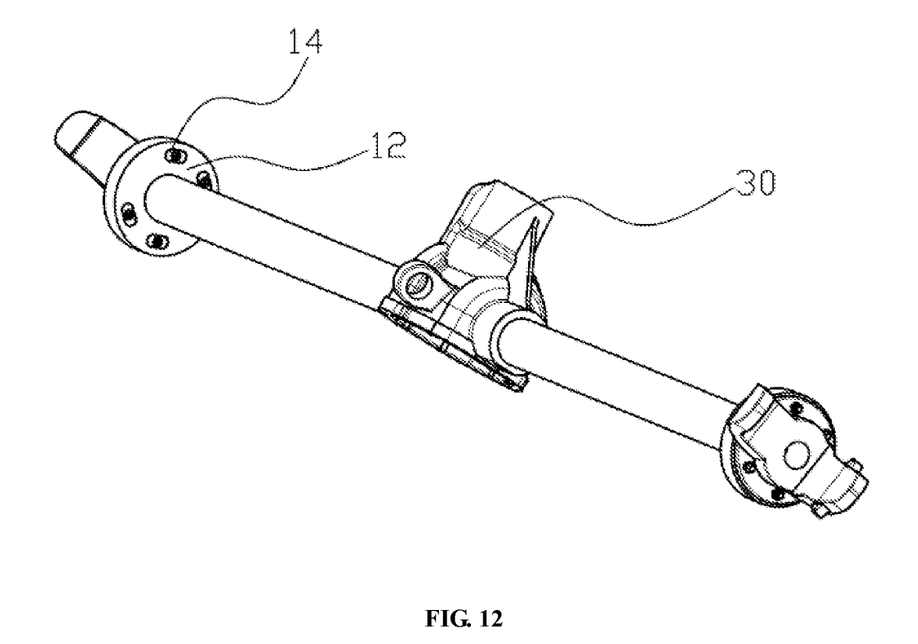
FIG. 12 is a schematic, isometric view of a front axle assembly with an inner-C-forging assembly according to a second embodiment of the present disclosure.
Figure 13:
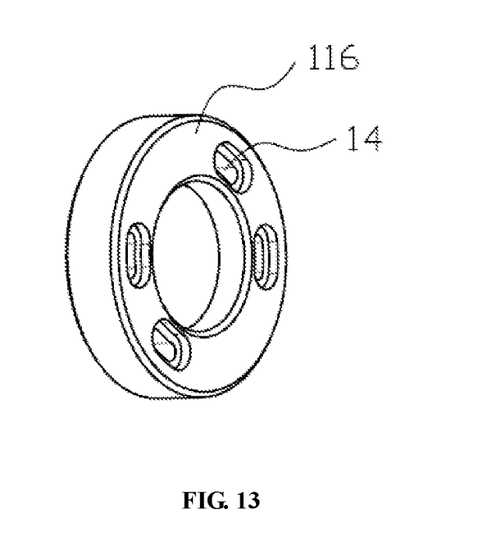
FIG. 13 is a schematic, isometric view of an assembly of a first flange and a second flange of FIG. 12.
Figure 14:
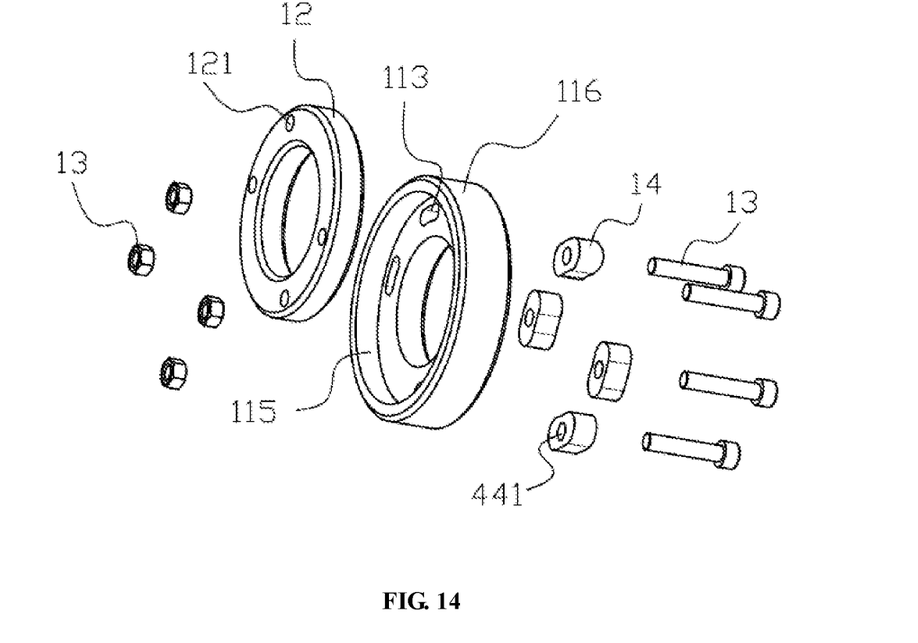
FIG. 14 is a schematic, exploded view of the assembly of FIG. 13.
Figure 15:
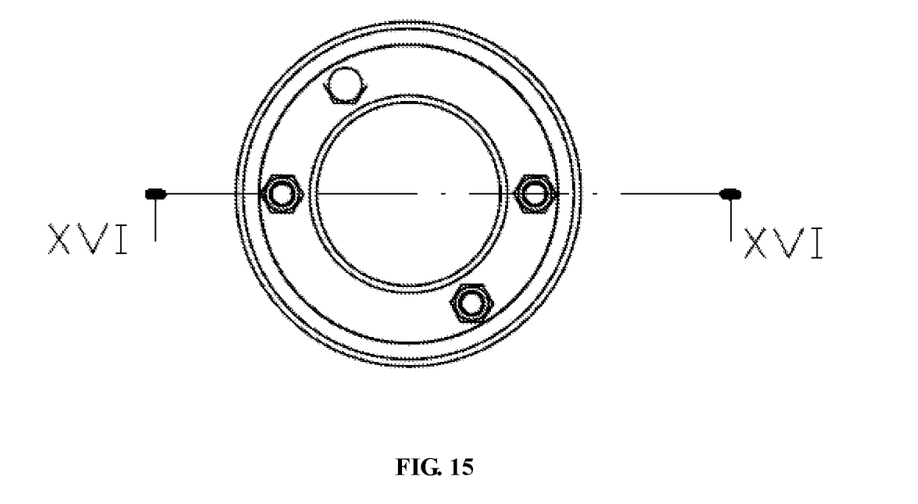
FIG. 15 is a schematic, front view of the assembly of FIG. 13.
Figure 16:
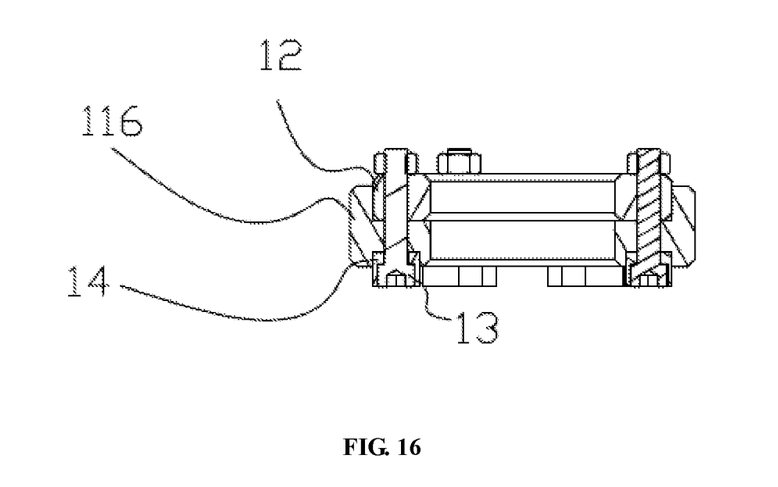
FIG. 16 is a schematic, cross-sectional view taken along line XVI-XVI of FIG. 15.

FIG. 12 is a schematic, isometric view of a front axle assembly with an inner-C-forging assembly according to a second embodiment of the present disclosure. FIG. 13 is a schematic, isometric view of an assembly of a first flange and a second flange of FIG. 12. FIG. 14 is a schematic, exploded view of the assembly of FIG. 13. FIG. 15 is a schematic, front view of the assembly of FIG. 13. FIG. 16 is a schematic, cross-sectional view taken along line XVI-XVI of FIG. 15. As shown in FIGS. 12-16, a second embodiment of the present disclosure provides an inner-C-forging assembly substantially identical to the first embodiment, the difference is, in this embodiment, a second flange 116 is arranged on the inner-C-forging 11 at a side facing the first flange, the second connection holes 113 are symmetrically distributed on the periphery of the second flange 116. Correspondingly, the accommodating cavity 115 is formed in the first flange or the second flange 116. When the accommodating cavity 115 is formed in the inner-C-forging 11, the accommodating cavity 115 is formed in the second flange 116.

This embodiment does not show the reinforcement shaft 114, it should be understood that in other embodiments, the reinforcement shaft 114 may also be provided on the second flange 116 at a side facing the first flange.

Figure 17:
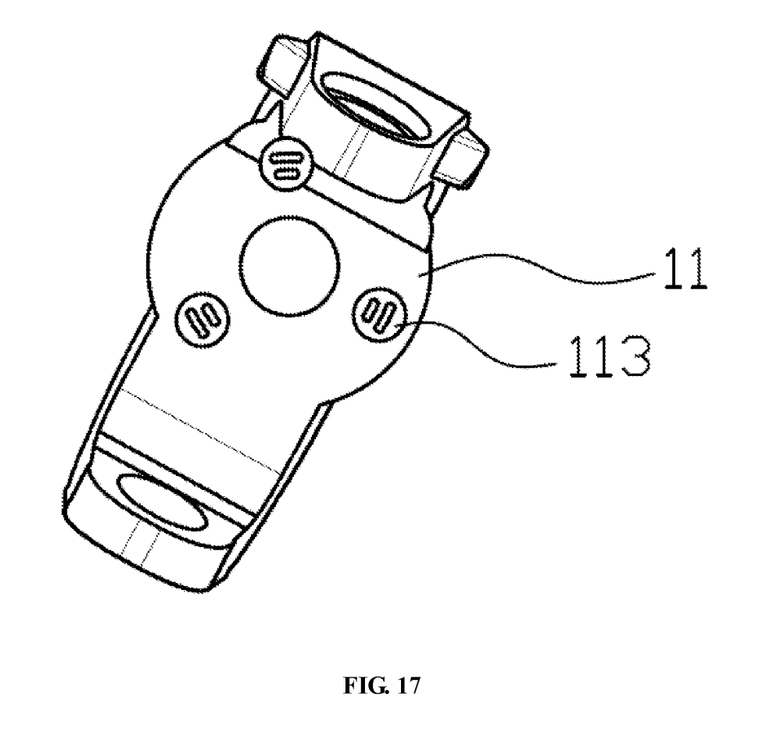
FIG. 17 is a schematic, front view of an inner-C-forging assembly according to a third embodiment of the present disclosure.
Figure 18:
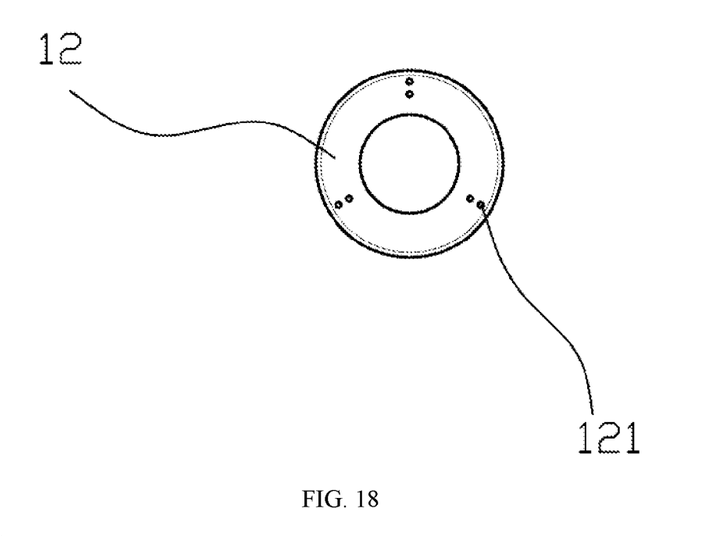
FIG. 18 is a schematic, front view of a connection structure according to the third embodiment of the present disclosure.
Figure 19:
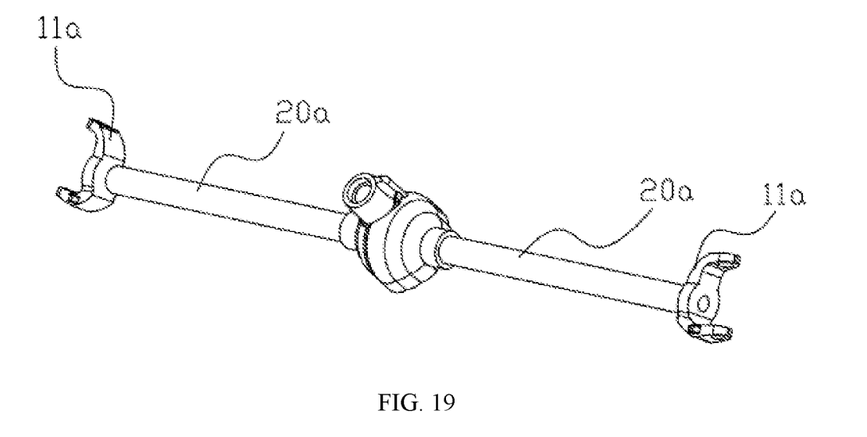
FIGS. 19-22 are schematic views of structures in different steps of a method for modifying a front axle assembly.
Figure 20:
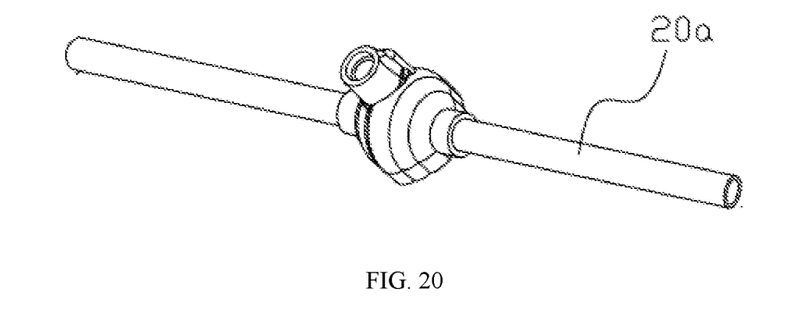
Figure 21:
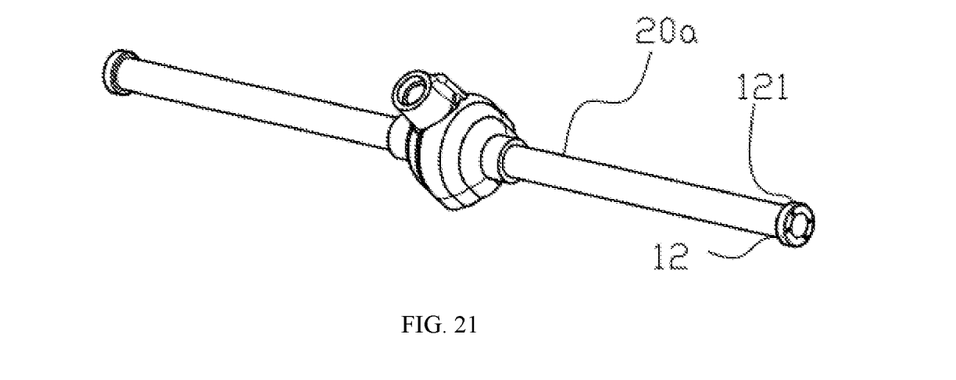
Figure 22:
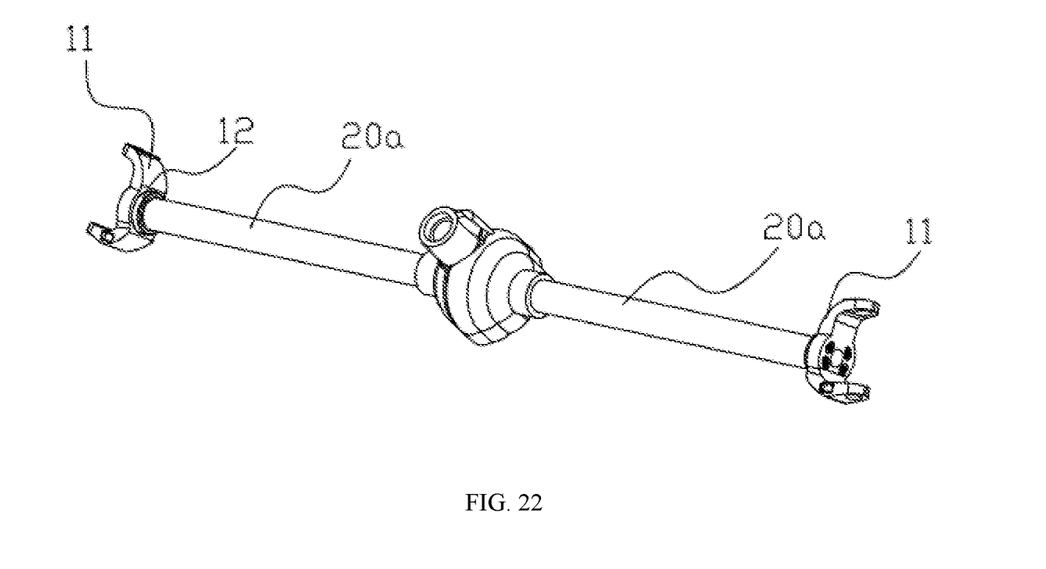

FIG. 17 is a schematic, front view of an inner-C-forging assembly according to a third embodiment of the present disclosure. FIG. 18 is a schematic, front view of a connection structure according to the third embodiment of the present disclosure As shown in FIGS. 17 and 18, the third embodiment of the present disclosure provides an inner-C-forging assembly substantially identical to the first embodiment and the second embodiment, the difference is, in the third embodiment, one of the first connection hole 121 and the second connection hole 113 it not an oblong hole, and the first connection hole 121 or the second connection hole 113 each is composed of a plurality of through holes arranged at intervals. That is, each of the first connection holes 121 or each of the second connection holes 113 indicates a range enclosing a plurality of through holes therein. The connector 13 is inserted into one of the through holes and the corresponding first connection hole 121 or second connection hole 113, to connect the inner-C-forging 11 with the connection structure 12. In this embodiment, each of the second connection holes 113 is composed of a plurality of through holes. The connector 13 is inserted through different through holes and the corresponding first connection hole 121 to realize different installation angles of the inner-C-forging 11 on the connection structure 12. In this embodiment, at each of the first connection hole 121 or the second connection hole 113, the plurality of through holes can intersect with each other and cooperatively form a long hole, and a plurality of arc-shaped edges are formed on the longitudinal side of the long hole to determine the position of the connector 13. This can reduce the area occupied by multiple through holes, and can distribute more through holes in a determined area, so that the caster angle can be adjusted more accurately.

Furthermore, in this embodiment, when the inner-C-forging 11 is fixed to the connection structure 12, on the same plane and at each of the first connection holes 121 or the second connection holes 113, the axis of the plurality of through holes are all set on the same circle centered on the axis of the axle shaft pass-through hole 112 of the inner-C-forging 11 or the axis of the axle tube 20. At each of the first connection holes 121 or the second connection holes 113, the axis of the plurality of through holes are all set on a longitudinal centerline of a corresponding insert 14.

Furthermore, in each of the insert 14, the plurality of the through holes can be formed in two rows, in each row, the axis of the through holes are arranged on the same circle centered on the axis of the axle shaft pass-through hole 112. That is, the distances from the axis of the two rows of through holes to the axis of the front axle assembly are different. Correspondingly, there are two second connection holes 113 or two first connection holes 121 corresponding to the two rows of through holes, with the two second connection holes 113 or the two first connection holes 121 spacing different distances from the axis of the front axle assembly. By means such arrangement, the caster angle can be adjusted with better accuracy for finer adjustment.

As shown in FIG. 17, the second connection hole 113 consisting of the plurality of through holes is formed in the inner-C-forging 11, and in the embodiment that the inner-C-forging 11 is provided with the second flange 116, the second connection hole 113 consisting of the plurality of through holes can be formed in the second flange 116.

In the present disclosure, the connection structure 12 can be fixed to an end of the axle tube 20, and the inner-C-forging 11 can be fixed to the connection structure 12. Due to the inner-C-forging 11 and the connection structure 12 are separately arranged, when the inner-C-forging 11 is fixed to the connection structure 12, the inner-C-forging 11 has multiple mounting states relative to the connection structure 12, so that the kingpin installation portion 111 on the inner-C-forging 11 have different positions and angles relative to the connection structure 12. When the caster angle needs to be adjusted, the connection between the corresponding inner-C-forging 11 and the connection structure 12 can be loosened, the inner-C-forging 11 can be rotated around the axis of the axle shaft pass-through hole 112 to an appropriate angle, which accordingly changes the installation angle of the inner-C-forging 11 relative to the axle tube 20, and changes the caster angle as well. Because the inner-C-forging 11 can be rotated about the axis of the axle shaft pass-through hole 112 toward the front and the rear directions of the vehicle, no matter which side of vehicle's caster angle needs to be adjusted, it can be adjusted by adjusting the installation angle of the corresponding inner-C-forging 11. Furthermore, since the inner-C-forging assembly 10 is separately arranged from the axle tube 20, and the integrity of the axle tube 20 is ensured, so that the mounting points of the components on the axle tube 20, such as the support point of the shock absorber and the connection point of various pull rods, can be arranged on a complete axle tube 20, and the support strength of the front axle assembly is ensured. Therefore, on the premise of ensuring the support strength of the front axle assembly, the vehicle's caster angles on both sides and the pinion to driveshaft angle simultaneously can be adjusted conveniently and independently. Simultaneously, the original position and angle of the mounting points of all components on the axle tube 20 is still intact, and the variables affecting the chassis wheelbase, directional accuracy and suspension height will not be introduced.

The present disclosure also provides a front axle assembly including the forgoing inner-C-forging assembly. Other technical features of the front axle assembly can be referred to the prior art, and will is not described further.

FIGS. 19-22 are schematic views of structures in different steps of a method for modifying the front axle assembly. As shown in FIGS. 19-22, the present disclosure also provides a method for modifying the front axle assembly by the forgoing inner-C-forging assembly 10, and the method includes the following steps:

Providing a common integral front axle assembly;
Cutting off an inner-C-forging 11a from an axle tube 20a of the integral front axle assembly;
Fixing the connection structure 12 of the present disclosure to an end surface of the axle tube 20a;
Fixing the inner-C-forging 11 of the present disclosure to the connection structure 12.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An inner-C-forging assembly comprising:
an inner-C-forging, configured for connecting with a kingpin knuckle; and
a connection structure, configured for connecting with an axle tube, the inner-C-forging being detachably fixed to the connection structure, and the inner-C-forging having different mounting states relative to the connection structure, at different mounting states, a kingpin installation portion of the inner-C-forging having different positions relative to the connection structure.

2. The inner-C-forging assembly according to claim 1, wherein the connection structure comprises a first flange, the first flange is configured for being fixed to an end of the axle tube, the first flange is provided with a first connection hole, the inner-C-forging is provided with a second connection hole, and a connector is capable of passing through the first connection hole and the second connection hole to fix the inner-C-forging on the connection structure.

3. The inner-C-forging assembly according to claim 2, wherein the second connection hole is provided on the inner-C-forging at an end away from the first flange.

4. The inner-C-forging assembly according to claim 2, wherein one of the first connection hole and the second connection hole comprises an oblong hole, an insert is provided in the oblong hole, and a third connection hole is defined in the insert, the insert has a plurality of different models, and an axis of the third connection hole has different positions on different models of inserts.

5. The inner-C-forging assembly according to claim 4, wherein the axis of the third connection holes of different models of inserts are all set on a same circle centered on an axis of an axle shaft pass-through hole of the inner-C-forging.

6. The inner-C-forging assembly according to claim 5, wherein a center angle formed by the axis of the third connection holes, the axis of the inner-C-forging and the center of different inserts is different.

7. The inner-C-forging assembly according to claim 4, wherein an angle between an axis of the kingpin installation portion and an axis of a driveshaft installation portion is adjusted within a range from 60° to 85° by utilizing different models of the inserts.

8. The inner-C-forging assembly according to claim 2, wherein each of the first connection holes or each of the second connection holes is composed of a plurality of through holes, and the connector passes through one of the through holes and into a corresponding first connection hole or a corresponding second connection hole.

9. The inner-C-forging assembly according to claim 8, wherein at each of the first connection hole or the second connection hole, the axis of the through holes are all set on a same circle centered on an axis of an axle shaft pass-through hole of the inner-C-forging or an axis of the axle tube.

10. The inner-C-forging assembly according to claim 9, wherein at each of the first connection hole or the second connection hole, the plurality of the through holes form in two rows, on each row, the axis of the through holes are arranged on the same circle centered on the axis of the axle shaft pass-through hole or the axis of the axle tube, the distances from the axis of the two rows of through holes to the axis of the axle shaft pass-through hole or the axis of the axle tube are different.

11. The inner-C-forging assembly according to claim 3, wherein the inner-C-forging is provided with a second flange at one side toward the first flange, and the second connection hole is formed in the second flange.

12. The inner-C-forging assembly according to claim 3, wherein an accommodating cavity is formed in one of the first flange and the inner-C-forging, when the inner-C-forging is connected to the connection structure, the first flange or the inner-C-forging is received in the accommodation cavity.

13. The inner-C-forging assembly according to claim 2, wherein a reinforcement shaft is provided on the inner-C-forging, when the inner-C-forging is fixed to the connection structure, the reinforcement shaft passes through the first flange.

14. A front axle assembly, comprising an inner-C-forging assembly comprising:
   an inner-C-forging, configured for connecting with a kingpin knuckle; and
   a connection structure, configured for connecting with an axle tube, the inner-C-forging being detachably fixed to the connection structure, and the inner-C-forging having different mounting states relative to the connection structure, a kingpin installation portion of the inner-C-forging having different angles relative to the connection structure at different mounting states.

15. The front axle assembly according to claim 14, wherein the connection structure comprises a plurality of first connection holes, the inner-C-forging comprises a plurality of second connection holes, and a plurality of connectors is capable of passing through the first connection holes and the second connection holes to fix the inner-C-forging on the connection structure.

16. The front axle assembly according to claim 15, wherein one of the first connection hole and the second connection hole comprises an oblong hole, an insert is provided in the oblong hole, and a third connection hole is defined in the insert, the insert has a plurality of different models, and an axis of the third connection hole has different positions on different models of inserts.

17. The front axle assembly according to claim 16, wherein the axis of the third connection holes of different models of inserts are all set on a same circle centered on an axis of an axle shaft pass-through hole of the inner-C-forging.

18. The front axle assembly according to claim 17, wherein a center angle formed by the axis of the third connection holes, the axis of the inner-C-forging and the center of different inserts is different.

19. The front axle assembly according to claim 16, wherein an angle between an axis of the kingpin installation portion and an axis of a driveshaft installation portion is adjusted within a range from 60° to 85° by utilizing different models of the inserts.

20. A modification method of a front axle assembly, comprising the following steps:
   providing an integral front axle assembly with an inner-C-forging integrally fixed to an axle tube into a single piece;
   cutting off the inner-C-forging from the axle tube of the integral front axle assembly;
   providing an inner-C-forging assembly according to claim 1, and fixing the connection structure of the inner-C-forging assembly on an end surface of the axle tube;
   fixing the inner-C-forging of the inner-C-forging assembly to the connection structure.

* * * * *